United States Patent [19]

Page et al.

[11] 4,423,909

[45] Jan. 3, 1984

[54] EMPTY AND LOAD APPARATUS FOR RAILROAD CARS

[76] Inventors: William R. Page, 20808-60th St., Bristol, Wis. 53104; James G. Rees, 1212 Lake Shore Dr., Chicago, Ill. 60610

[21] Appl. No.: 316,844

[22] Filed: Oct. 30, 1981

[51] Int. Cl.³ .................................................. B60T 8/20
[52] U.S. Cl. ...................................................... 303/23 R
[58] Field of Search ........... 188/195; 303/22 A, 22 R, 303/23 A, 23 R

[56] References Cited

U.S. PATENT DOCUMENTS

| Re. 28,539 | 9/1975 | Scott | 303/22 R |
|---|---|---|---|
| 3,338,638 | 8/1967 | Kirk et al. | 303/22 |
| 3,460,870 | 8/1969 | Kirk | 303/22 |
| 3,606,485 | 9/1971 | Scott | 303/23 |
| 3,671,086 | 6/1972 | Scott | 303/23 R |
| 4,080,005 | 3/1978 | Engle | 303/23 R |
| 4,093,315 | 6/1978 | Page et al. | 303/59 |
| 4,143,923 | 3/1979 | King | 303/23 R X |
| 4,179,165 | 12/1979 | Page et al. | 303/59 |
| 4,230,374 | 10/1980 | King | 303/23 R X |

*Primary Examiner*—Duane A. Reger
*Attorney, Agent, or Firm*—McWilliams, Mann, Zummer and Sweeney

[57] ABSTRACT

An empty and load air brake control apparatus for railroad freight cars, for applying full braking forces to the car wheels when the car is riding loaded, but for applying reduced braking forces to the car wheels that are at appropriate force levels when the car rides empty, in which in addition to the conventional brake pipe, AB or ABD control valve, the auxiliary and emergency reservors, the brake cylinder, and the retaining valve, are included a special load sensing device and a modulating valve for supplying full braking air pressures to the brake cylinder when the car rides loaded and reduced braking air pressures to the brake cylinder when the car rides empty. The components of the apparatus are arranged and connected so that the load sensing device controls the operation of the modulating valve to supply the braking air to the brake cylinder that is appropriate for either loaded or empty braking, while providing for full braking air release at the retaining valve to the exclusion of the load sensing device, even when rock and roll are occasioned.

The arrangement is such that once the control apparatus is set to provide for the appropriate car braking, as sensed by the load sensing device, no amount of rock and roll can change the setting to loaded car braking where the car is riding empty or vice versa.

18 Claims, 13 Drawing Figures

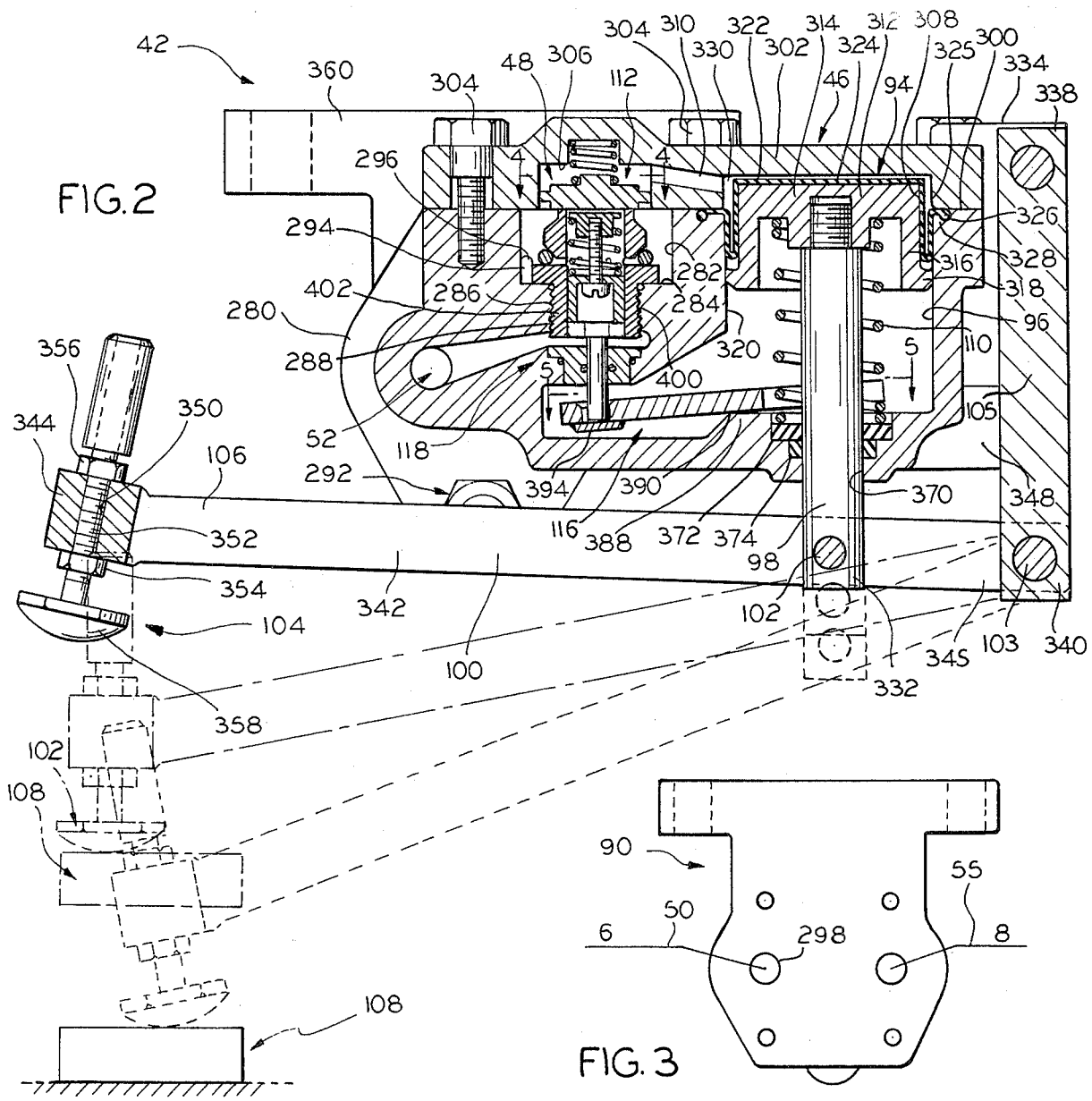
FIG. 2
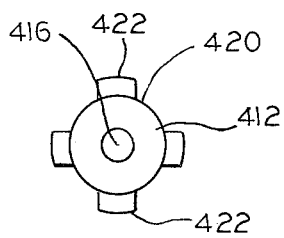
FIG. 4
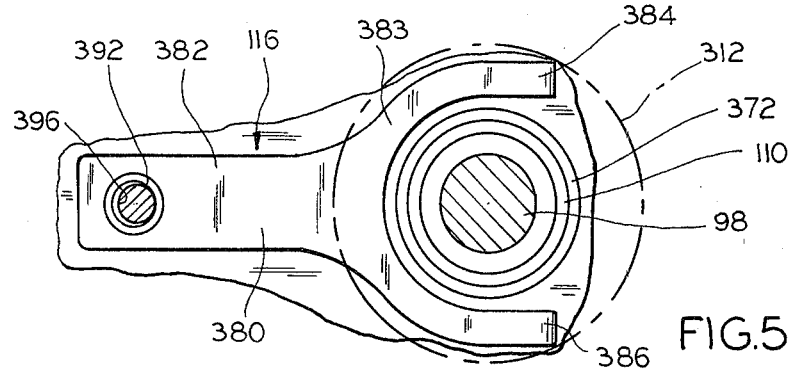
FIG. 3
FIG. 5

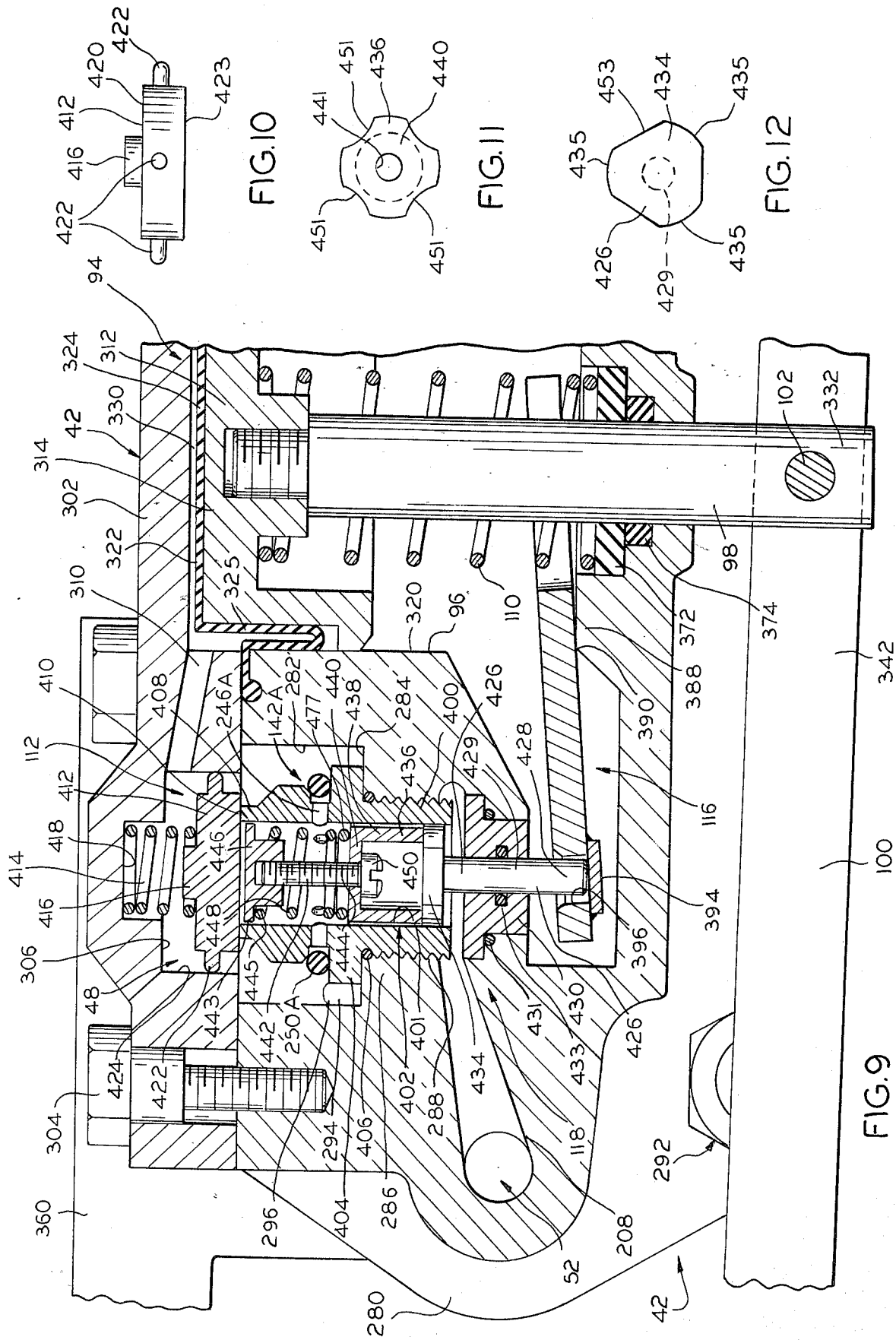

EMPTY AND LOAD APPARATUS FOR RAILROAD CARS

This invention relates to empty and load air brake control apparatus for railroad cars, and more particularly, to air brake control apparatus for railroad freight cars that provides, when the car rides loaded, full braking forces that the car wheels, while when the car rides empty, reduced braking forces at the car wheels that are at appropriate levels for empty car braking.

For some years railroad car air brake control apparatus of this general type has been available for use in conjunction with the well-known AB or ABD control valve, the auxiliary and emergency reservoirs, the brake cylinder, and the retaining valved, so-called empty and load equipment that includes a load sensing device for automatically determining car load condition based on truck spring flection, and a change over valve device arrangement through which the braking air is supplied to provide the correct air pressure to brake cylinder, according to whether the car is riding loaded or empty. Such equipment avoids excessive braking when the car rides empty, and gross underbraking when the car rides loaded.

Empty and load air brake control equipment has special utility in connection with the modern high capacity railroad freight cars, such as hopper, gondola, and tank cars, which usually run either fully loaded or empty, with the car as loaded greatly exceeding in weight the car as riding empty. However, the problems of adequately controlling the brake application forces for such and similar cars have been increasingly complicated by the well-known rock and roll problem.

As is common knowledge in the railroad field, over the years the design of freight cars has been revised to improve their carrying capacity, so that today 100 ton cars are common place. As the various types of cars involved have gone up in capacity and carry larger loads, the center of gravity of the cars as loaded has moved upwardly, and then, of course, the greater mass and the higher center of gravity combine to accentuate the tendency of the car to rock or sway about its longitudinal axis as it moves along the track, when such factors as the truck and rail joint spacing, speed of movement, and basic spring rates of the car truck spring groups are taken into consideration. Experience has shown that any fully loaded car of 100 ton capacity and up moving at speeds of 15 to 17 miles per hour that passes over three low rail joints in a row will develop a servere tendency to roll with significant likelihood of wheel lift and in severe cases actual derailment.

This rocking or swaying action has come to be known in railroad terminology as "rock and roll". Insofar as empty and load air brake control equipment is concerned, the car body, which comprises the sprung portion of the car to which the load sensor is suitably attached adjacent a convenient truck side frame that comprises the car unsprung portion, in rocking and rolling from one side to the other when socalled rock and roll is occasioned, effects movement of the sprung car body portion carrying the load sensor, relative to the unsprung part of the car with which the load sensor feeler or measuring member is to cooperate. it will be apparent that during braking applications such rock and roll action may cause the load sensing device to falsely sense momentarily that the car is riding under loaded conditions when in fact the car is empty, while if the car is riding empty it may falsely sense momentarily that the car is riding loaded. Experience has shown that conventional empty and load equipment can malfunction for this reason, when the brakes are to be applied when car body rock and roll is occurring, even though satisfactory functioning of such equipment is normally achieved where rock and roll is not involved.

Another problem encountered with conventional empty and load equipment is that the load sensing device is arranged for venting purposes under loaded conditions, which, when rock and roll occurs, results in undesirable repeated venting of the braking air pressure at the sensor; this has the effect of reducing the braking air available, and under fully loaded conditions this may very well be well reduce the braking air pressure well below acceptable levels.

A principal object of this invention is to provide an empty and load air brake control apparatus for railroad freight cars that handles rock and roll action without adversely affecting the braking air to be supplied to the brake cylinder for either empty or loaded car braking.

Another principal object of the invention is to provide an empty and load air brake control apparatus which, when the car rides empty, positively sets the apparatus for empty load condition brake application in the manner that no amount of rock and roll during the brake application can change such setting.

Yet another principal object of the invention is to provide an empty and load air brake control apparatus in which the only air exhaust during operation of the brakes is during the brake release stroke at the retainer valve, thereby insuring that all the braking air supplied by the auxiliary and emergency reservoirs during a braking stroke will be available without pressure reduction to the brake cylinder.

Another important object of the invention is to provide empty and load air brake control apparatus in which the change over valve is in the form of a simplified modulating valve device of established reliability through which the braking air is both supplied to the brake cylinder from the AB valve or its equivalent and is released from the brake cylinder to the AB valve or its equivalent for release or venting at the retainer valve.

Yet another important object of the invention is to provide an empty and load air brake control method and apparatus which are free from the adverse effects of rock and roll.

Still other objects of the invention are to provide an empty and load air brake control apparatus that is economical of manufacture, easy to install and service, and long lived and reliable in operation.

In accordance with the invention, an empty and load air brake control regulating apparatus is provided that includes in addition to the usual AB or ABD control valve, auxiliary and emergency reservoirs, brake cylinder, retaining valve, brake pipe and brake cylinder pipe, a novel load sensing device that operates automatically to determine, for each brake power stroke, if the car is empty or loaded, without its said determination being confused or cancelled out by rock and roll action, and a simplified and reliable modulating valve by way of which the braking air pressures from the AB or ABD valve during a brake application are either supplied to the brake cylinder at full force levels for loaded car braking conditions, or the braking air is supplied to the brake cylinder at pressure levels appropriate for empty conditions, such as pressure conditions in the area of 60 to 62 percent of full pressure conditions. The brake pipe, AB or ABD valve, the auxiliary and emergency reservoirs, and the retainer valve are arranged in their well-known conventional manners, with this equipment being supplemented by a modulating valve of the type disclosed in our prior U.S. Pat. Nos. 4,093,315 and 4,179,165 (the disclosures of which are incorporated herein by this reference), suitably mounted on the car body sprung portion, and a special load sensing device also carried by the car body sprung portion adjacent one of the car trucks. The load sensing device includes a load sensing member in the form of a lever that cooperates with the stop applied to one of the truck side frames that comprises an unsprung part of the car, so as to sense the relative weight of the body sprung port based on the elevation of the car with respect to the truck side frames, and this, of course, will depend on the load condition of the car. The air conduiting from the AB or ABD valve to the brake cylinder has incorporated therein the indicated modulating valve and the load sensing device to provide for automatic sensing of the load condition of the car at the initiation of each brake stroke application, and the application to the brake cylinder of braking car pressures appropriate for braking the car at its sensed load condition. Thus, for loaded conditions, as sensed by the load sensing device, the braking air passes through the modulating valve and thence to the brake cylinder at full pressure conditions, with the conduiting involved including a lateral or side connection to the load sensing device for effecting the measuring stroke of same, and with the released air returning to the AB or ABD valve or its equivalent through the modulating valve for release at the retainer valve. For empty load conditions, the braking air is also communicated to, by the operation of the load sensing device, a different portion of the modulating valve and through a branch conduiting arrangement that includes the load sensing device, to condition the modulating valve to provide the braking air to the brake cylinder at the reduced pressures appropriate for empty load conditions.

The load sensing device comprises a casing that includes piston means for actuating the sensing device load sensing member, with which it is articulated, with the casing defining a first chamber in open communication with one side of the piston means and a second chamber that is spaced and normally isolated from the piston means. A special check valve assembly is interposed between the casing first and second chambers that includes means for biasing means to closed relation for maintaining the casing first chamber sealed off from the casing second chamber on operation of the empty and load apparatus when the car body is under full load riding conditions. The piston means also is operably associated, in lost motion relation to same, with a linkage for opening the said casing check valve assembly to communicate the casing second chamber to the casing first chamber when the car body is under empty riding conditions. The linkage involved comprises a fulcrumed lever device having one end of same in lost motion relation to the piston means for fulcruming actuation thereby when the load sensing member is moved to its extended relation, to force the indicated check valve assembly to its open relation, in opposition to the biasing forces that normally hold it closed.

The conduiting connections to the load sensing device involve communication with the full braking air pressure discharge from the modulating valve, by way of the lateral conduit connected to the brake cylinder pipe, to the indicated casing first chamber, and the branch conduit, in which a volume reservoir is incoporated that is connected between the casing second chamber, and the change over side of the modulating valve, for conditioning the modulating valve, when the car rides empty, to effect supply of the braking air to the braking cylinder at reduced pressures appropriate for empty load conditions.

The arrangement is such that the load sensing device operates automatically for each brake application, and at the initiation of same, to sense the condition of load of the car, that is whether empty or loaded, with the sensing action taking place as soon as the air brake pressure to the brake cylinder approximates 15 pounds per square inch (psi). Where the car is riding loaded, the load sensing device remains set to provide full braking air pressures from the modulating valve to the brake cylinder, with the braking application being completed and the braking air released through a check valve forming a part of the modulating valve and back to the AB control valve or its equivalent for release in the usual manner, though this invention contemplates that no braking air will be released at the load sensing device or modulating under any condition, and that all braking air will be released at the retainer valve.

Where the car rides empty, as the pressure of the braking air moving in the conduiting involved to the brake cylinder builds up past the approximately 15 psi level, the sensing device functions automatically to make its sensing stroke, and the sensing device feeler arm moves to its full travel due to the elevation of the sprung railroad car body portion above its loaded riding condition, thereby correspondingly spacing the load sensing device upwardly of the truck side frame stop that is involved. The full travel of the sensing device piston means effects actuation of the sensor fulcrumed lever device to force open the sensor check valve assembly while the braking air pressure remains relatively low which effects communication through the check valve assembly of the two sensor casing chambers whereby the modulating valve is made operative through the branch conduit and volume reservoir to limit the pressure of the braking air supplied to the brake cylinder to a predetermined percentage of of that supplied by the AB valve (a percentage in the range of from about sixty to about sixty-two percent is preferred for most applications) whereby the brake cylinder is operative to brake the car with forces appropriate for empty riding conditions. On the brake cylinder release stroke, the braking air exhausts through the check valve forming a part of the modulating valve and thence through the AB valve or its equivalent to the retaining valve. At the sensor device, the sensor check valve assembly is held open for air release therefrom first by the fulcrum lever device, and after the braking air pressure has dropped to the approximate 15 psi level then by the differential air pressure condition that is involved in the sensor and associated conduiting for release purposes, whereby all pressure release from the brake cylinder and volume reservoir and associated conduiting is through the AB valve or its equivalent and the retainer.

A characteristic of the empty and load arrangement of this invention is that once the empty and load equipment is set for empty car braking, no amount of rock and roll can change this setting. Where the car rides loaded, rock and roll will also be ineffective to change this setting.

Furthermore, the empty and load arrangement of the present invention contemplates that there is no direct exhaust or discharge of air from the sensor or elsewhere short of the retainer valve, and consequently rock and roll cannot adversely effect the value of brake cylinder pressure by local exhausting.

Other objects, uses, and advantages will be obvious or become apparent from a consideration of the following detailed description and the application drawings, in which like reference numerals indicate like parts throughout the several views.

In the drawings:

FIG. 1 is a diagrammatic view partially in block diagram form, showing in block diagram form the familiar conventional air operated and operating components of a typical railroad freight vehicle air brake system, with the modulating valve and load sensing components of the air brake system of the present application and related components being more specifically illustrated, the modulating valve being shown diagrammatically in section and the load sensing device being shown in elevation, and with the air conduiting incorporating these components being shown in line form;

FIG. 2 is a vertical sectional view through the load sensing device shown in FIG. 1, but on an enlarged scale, to better depict its internal parts, and also indicating the three principal operating positions of the sensor feeler lever in the fully retracted, empty load, and fully loaded positions;

FIG. 3 is an elevational view of the sensing device pipe bracket, taken substantially along line 3—3 of FIG. 7, showing only the pipe bracket;

FIG. 4 is a fragmental top plan view of the disc member that forms the check valve member of the check valve assembly of the sensor device of FIG. 2;

FIG. 5 is a diagrammatic fragmental plan view of the fulcrumed lever device that is operated by the load sensor piston assembly on empty load sensing, taken substantially along line 5—5 of FIG. 2, with related parts being shown in outline;

FIG. 9 is a view of the sensor device as shown in FIG. 2, but showing the internal components of same on an enlarged scale;

FIG. 10 is a side elevational view of the check valve member shown in FIG. 4, illustrating diagrammatically a detail of construction;

FIG. 11 is a top plan view of the cupped spring seat of the plunger assembly of FIGS. 2 and 9, diagrammatically illustrating a detail of construction; and FIG. 12 is a top plan view of the head of the headed pin of the plunger assembly of FIGS. 2 and 9, diagrammatically illustrating a detail of construction.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

GENERAL DESCRIPTION

Figure 1:
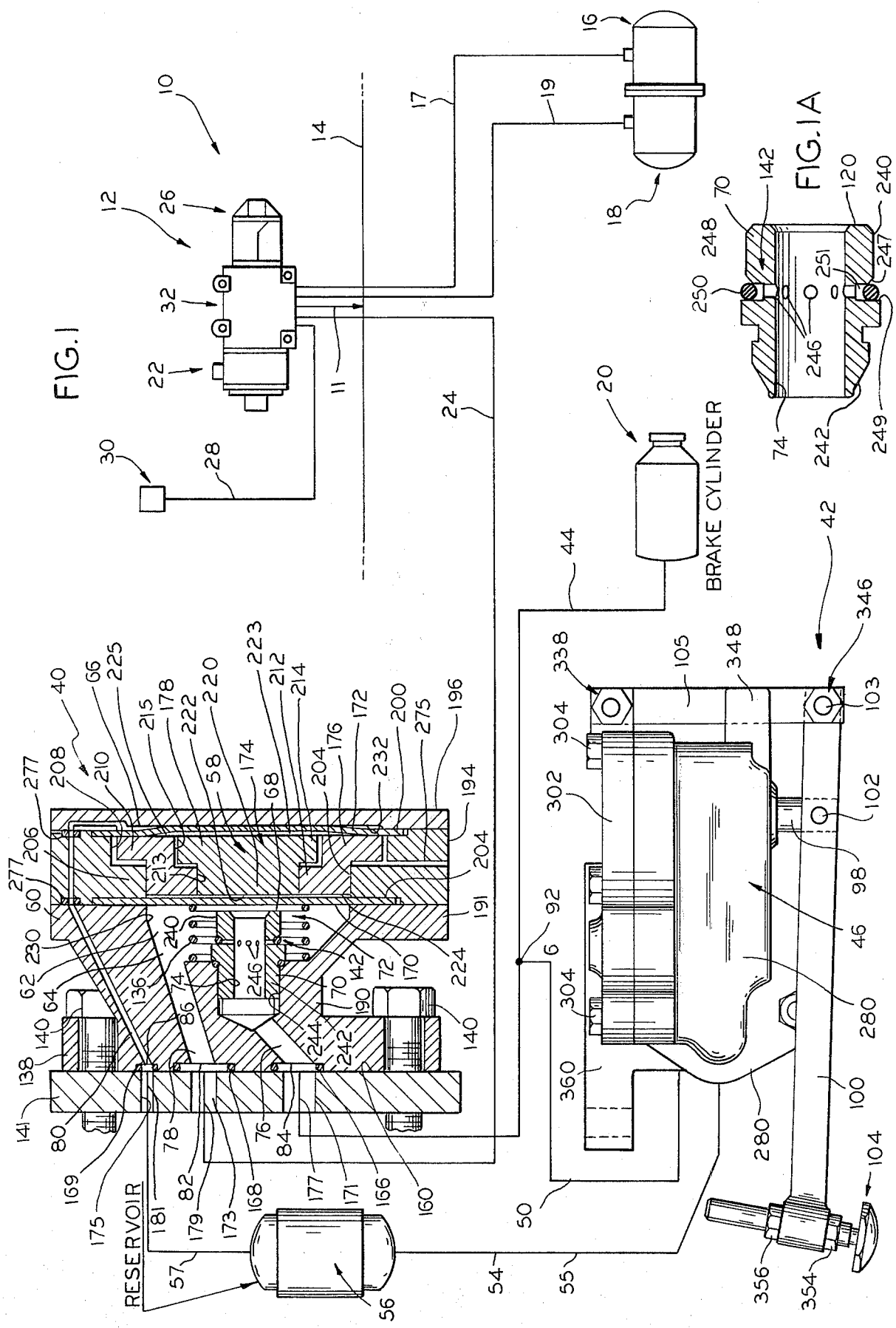
FIG. 1A is a sectional view of a special check valve employed in the modulating valve, shown as it appears in FIG. 1, but on an enlarged scale.
Figure 6:
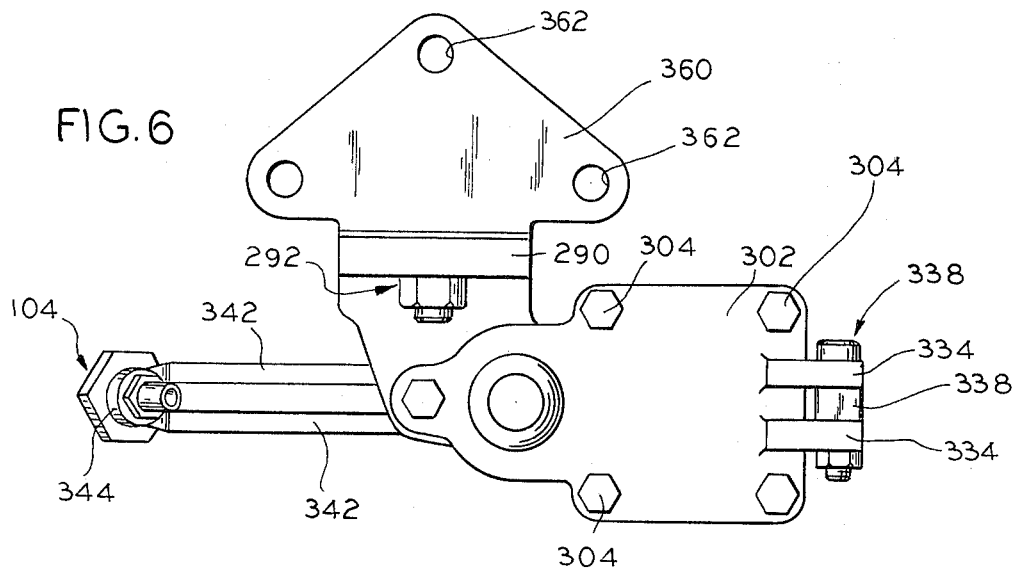
FIG. 6 is a top plan view of the sensing device shown in FIGS. 1 and 2.
Figure 7:
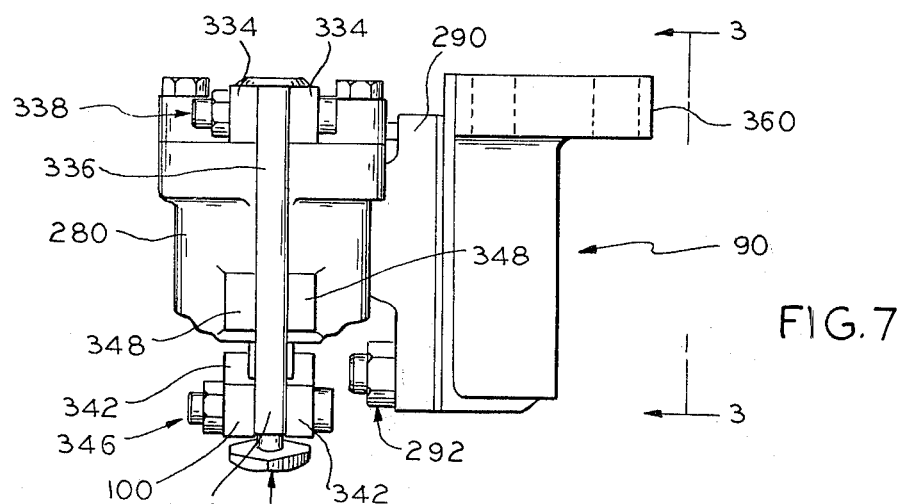
FIG. 7 is an end elevational view of the sensing device as viewed from the right hand side of same as shown in FIGS. 1 and 2.

Reference numeral 10 of FIG. 1 generally indicates an empty and load railroad car air brake control apparatus arranged in accordance with the present invention which includes the usual AB or ABD control valve 12 to which is connected the familiar brake pipe 14, the usual and conventional auxiliary reservoirs 16 and 18 and brake cylinder 20, all of which are mounted in the usual and conventional manner on the sprung portion of a railroad car, which typically involves the car body applied to the familiar truck bolsters that at their ends rest on spring groups that are respectively supported by the truck side frames which are journalled in the usual manner on the truck axles that ride on wheels that engage the usual track rails (all of which are standard railroad car structures that require no illustration in view of long standing practices concerning same in this field of endeavor).

Control valve 12 typically includes service portion 22 adapted to operate at both a service and an emergency rate of reduction in pressure of the braking air fluid in the car brake pipe 14 for supplying the braking air under pressure from the auxiliary reservoir 16 to brake cylinder 20. Control valve 12 also includes emergency portion 26 adapted to operate only upon an emergency rate of reduction of pressure in the brake pipe 14 for supplying braking air under pressure from emergency reservoir 18 to the brake cylinder 20. Control valve 12 may, of course, be of the ABD type, and hereinafter in this disclosure the term "AB control valve" means both the well known AB control valve and the newer ABD control valve, since for the purposes of this invention they are equivalents. For illustrative purposes, control valve 12 is shown connected to brake pipe 14 by pipe 11.

As is conventional, on release of the brakes, with the consequent recharging of the brake pipe 14, control valve 12 operates to open the brake cylinder 20 to atmosphere through pipe 28 and retaining valve 30; at the same time, the recharging of the brake pipe 14 affects the recharging of the reservoirs 16 and 18 in the usual and well-known manner. The service and emergency portions 22 and 26 of the control valve 12 are mounted on the opposite faces of a pipe bracket 32 to which all pipe connections to the brake control valve 12 are made, as is conventional, as indicated in the showing of FIG. 1.

In accordance with the present invention, braking air supply and return pipe 24 is connected to a changeover valve in the form of modulating valve 40 that is disclosed in our prior U.S. Pat. Nos. 4,093,315 and 4,179,165, but is arranged and connected so as to supply braking air at full braking pressures to the brake cylinder 20 when the car rides loaded, but which is arranged in accordance with the present invention to be operated by special load sensing device 42 to effect supply of such braking air to the brake cylinder 20, when the car rides empty, at pressure levels appropriate for the car riding empty, which in accordance with the present disclosure is at a pressure reduction of approximately 38 to 40 percent. For this purpose, modulating valve 40 is connected to brake cylinder 20 by brake pipe or conduit 44. The load sensing device 42 comprises a casing 46 defining a first chamber 48 which is connected to conduit 44 by side conduit 50. Load sensing device 42 also is formed to define a second chamber 52 that is connected to the modulating valve 40 by branch conduit 54 that includes section 55 that connects to one end of volume reservoir 56, and section 57 that connects the other end of the volume reservoir to modulating valve 40.

The modulating valve 40 comprises differential valve member 58 mounted across the valve housing 60 to separate its central cavity 62 into separate chambers 64 and 66. Valve member 58 cooperates with an annular valve seat 68 formed on tubular member 70 to form air flow shut off valve 72, with the tubular member 70 having its bore 74 in open communication with passage 76 defined by the housing 60. Housing 60 is also formed to define passage 78 that communicates with chamber 64 and a passage 80 that communicates with chamber 66. The braking air supply and return conduit or pipe 24 is suitably connected to the port 82 of passage 78 while brake cylinder pipe or conduit 44 is suitably connected to port 84 of passage 76. Branch conduit 54 is connected to port 86 of modulating valve passage 80 and at its other end is connected to sensor chamber 52 as diagrammatically illustrated in FIG. 2, by way of pipe bracket 90 that is diagrammatically illustrated in FIG. 3. The side conduit 50 is shown suitably connected to brake cylinder pipe 44 at suitable connection 92 and at its other end is suitably connected to the sensor chamber 48, as by way of the pipe bracket 90, as will be described in detail hereinafter.

The sensor 42 also includes piston device 94 reciprocably mounted in cylinder 96 defined by casing 46 and having piston rod 98 pivotally connected to sensing lever 100 by suitable pin 102, lever 100 being pivotally connected to casing 46 by suitable pivot pin 103 and link 105 and carrying adjustable foot 104 at its free end 106 that is adapted to engage with suitable stop 108 that is shown only in block diagram form, but is of the usual type for empty and load brake regulating equipment and that is carried by a suitable part of the unsprung portion of the car, such as the truck side frame adjacent to the sprung body portion to which the sensing device 42 is suitably mounted or connected.

Piston device 94 is biased to its retracted position of FIG. 2 by a suitable compression spring 110 which holds the sensing lever 100 in its full line retracted position of FIGS. 1 and 2 when the brakes are not functioning. Operably mounted within sensing device 42 is check valve assembly 112 that is interposed between the sensor chambers 48 and 52, and that is normally closed to maintain the chambers 48 and 52 sealed from each other. Chambers 48 and 52 are placed in communication when the air brakes are operated under car empty load carrying conditions, wherein the piston device 94 operates a fulcrum lever device 116 to force open the check valve assembly 112 through plunger device 118.

In accordance with the invention, when the car equipped the apparatus 10 rides fully loaded or nearly so, and a braking stroke is initiated, the braking air pressure is applied to braking air supply and return conduit 24 through control valve 12 and enters chamber 64 of modulating valve device 40 through port 82 and passage 78 and passes through normally open shut off valve 72, passage 76, and port 84 to brake cylinder pipe 44 and thus brake cylinder 20 under full pressure conditions, which pressure conditions are transmitted through side conduit 50 to sensing device chamber 48 to assist in maintaining check valve assembly 112 closed through the braking stroke, and also shift piston assembly 94 from its retracted position shown in FIG. 2 to its partially extended position diagrammatically illustrated in FIG. 2 as the loaded car extended position, whereby the measuring stroke of sensor member 100 will have taken place leaving the piston assembly 94 well short of the fulcrum lever device 116. The full brake stroke will proceed under full braking air pressures to the brake cylinder 20, and on release, the braking air returns to control valve 12 for release at retainer valve 30, via brake cylinder pipe 44 a later described check valve 142 of modulating valve 40, modulating valve chamber 64, passage 78, and the braking air supply and return conduit 24, with the braking air of sensor chamber 48 exiting from the system in a similar manner whereby spring 110 retracts piston device 94 to its retracted position of FIG. 2, thereby retracting the sensing lever 100 to its corresponding retracted position.

Under empty conditions, on initiation of the braking stroke, the braking air supplied by the control valve 12 passes to the modulating valve chamber 64 via braking air supply and return conduit 24 and to brake cylinder 20 and sensor chamber 48 via the respective conduits 44 and 50. As the braking air pressure reaches the level of approximately 15 psi, piston device 94 is shifted downwardly to its extended position, which will be the lowest, or empty position indicated in FIG. 2, by which time piston device 94 will strike and actuate the fulcrum lever device 116 to force open check valve assembly 112 whereby chambers 48 and 52 are placed in communication. The braking air will then pass from chamber 48 through chamber 52 and conduit 54, into and through volume reservoir 56 and thence to chamber 66 of modulating valve 40 via its port 86 and passage 80, which effects operation of the modulating valve 40 to limit the pressure of the braking air supplied to brake cylinder 20 to approximately 60 to 62 percent of the braking pressure supplied to the brake cylinder under loaded conditions.

As will be apparent from the specific description that follows hereinafter, the sensing device 42 is arranged to accommodate rock and roll action without effecting the setting of the device for either empty or loaded car riding conditions. Further, the air brake regulating apparatus involved is arranged so that all discharge of the braking air is through the control valve 12 and retainer valve 30 so that no braking air is lost at the sensor 42 or elsewhere short of retainer valve 30 regardless of whether or not rock or roll is occasioned during the braking stroke.

SPECIFIC DESCRIPTION

The components of apparatus 10 that are standard to railroad car air brake control equipment, such as the AB control valve 12, the auxiliary and emergency reservoirs 16 and 18, the brake cylinder 20, and the retainer valve 30 are arranged and mounted in any suitable conventional manner on the car sprung portion (normally the car body), in association with the conventional brake pipe 14, as will be apparent to those skilled in the art. As is also conventional, the brake pipes of adjacent cars in the train are connected together and to the train locomotive using the well known coupling connectors.

The modulating valve 40 is arranged in accordance with our said U.S. Pat. Nos. 4,093,315 and 4,179,165, to which reference may be had for specific disclosures of the modulating valve 40. For purposes of complete disclosure, FIG. 1 diagrammatically illustrates the basic components of same which have been already partially described.

The valve 40 may also be suitably mounted on the railroad car in any suitable conventional manner and for this purpose housing 60 is suitably flanged as at 138 for application thereto of suitable bolts 140 to bracket plate 141 that is likewise suitably secured to the car body. Valve 40 also may be suitably integrated with control valve 12.

The differential valve member 58 of modulating valve 40 is spring biased away from seat 68 by suitable compression spring 136. Operably associated with the tubular member 70 is check valve 142 (see FIG. 1A) that is operative to accommodate air flow from the brake cylinder 20 through the brake cylinder pipe 44 and control valve 12 and thence to retainer 30 on release of the brakes, as described hereinafter.

The bracket plate 141 as illustrated is formed to define planar land or surface 160 against which the housing 60 seats for application thereto of the mounting bolts 140. Suitable O-ring seals 166, 168 and 169 are employed between the housing 60 and the bracket plate 62 for sealing purposes at the juncture of the respective passages 76, 78, and 80 with the corresponding ports 171, 173 and 175 of the bracket plate 62; bracket plate 62 in practice may be in the form of a pipe bracket to which the ends 177, 179, and 181 of the respective conduits 44, 24, and 54 may be suitably leak free connected in any manner known to the art.

The differential valve member 58 of modulating valve 40 comprises inner diaphragm 170 and an outer diaphragm 172 operably associated with and receiving therebetween the composite piston 174 that structurally comprises a radial outer annular piston part 176 that receives in the lost motion manner an inner piston part 178. The piston parts 176 and 178 are in substantial coplanar relation between the diaphragms 170 and 172, and are proportioned laterally of the valve member 114 so that they may be engaged by both diaphragms 170 and 172 when aligned for this in the plane of the member 58.

In the specific form illustrated, the housing 68 comprises a base or pedestal 190 that is formed with a flange 191 on which is seated annular diaphragm mounting member 194 on top of which is applied the housing closure cap 196, and these parts being suitably held together as by employing bolts or the like, as shown in said patents.

The diaphragms 170 and 172, which are formed from a suitable elastomeric material such as polyurethane, are in disc form having their rims 200 clamped in seal tight relation against the mounting member 94 by the action of the bolts fixing cap 196 to housing 60.

As indicated in FIG. 1, the diaphragm mounting member 94 is formed with a stepped diameter opening 204 defining a flange 206 and a counterbore 208, with the outer piston part 176 being of rounded annular configuration and defining an outwardly directed radial flange 210 that cooperates with the flange 206, and an inwardly directed radial flange 212 that freely receives theinner piston part 174 in the bore 213 and counterbore 215 defined by the same. The inner piston part 178 defines outwardly directed radial flange 214 which cooperates with flange 212 of the outer piston part 176.

The piston parts 176 and 178 are proportioned radially thereof and transversely of the valve member 40 so that the outer piston part 176 is freely received within the diaphragm mounting component 194, and the inner piston part 178 is freely received within the outer piston part 176, as indicated in FIG. 1. Furthermore, the flanges 206 and 210, and the flanges 212 and 214, of the diaphragm mounting component 194 and the piston parts respectively, are proportioned transversely of the valve member 174 (that is, in its direction of movement relative to seat 68), so that the outer piston part 176 will have some lost motion movement relative to the diaphragm mounting component 194 in the direction of movement of the valve member 58, while the inner piston component 178 will have some lost motion movement with respect to the outer piston component 176 in the same direction.

The inner piston part 178 also defines a stud or hub portion 220 having a generally planar inwardly directed working surface 222 having a diameter that exceeds both that of the seat 68 and the tubular element 70 on which the seat 68 is formed; the inner piston part 178 also includes an outer working surface 223 having a diameter that exceeds that of surface 222 such that the area of surface 223 will exceed that of surface 222 by the predetermined amounts specified in said patents. The outer piston part 176 defines an inwardly directed working surface 224 that is annular in configuration and has an inner diameter that exceeds that of the working surface 222, and an outer diameter that is less than the diameter of bore 204 of the diaphragm mounting component 194. Piston part 176 also defines an outwardly directed annular working surface 225 having inner and outer diameters such that the area of surface 225 exceeds that of surface 224 by the predetermined amount disclosed in said patents.

In the embodiment of the modulating valve 40 shown in FIG. 1, the spring 136 bears against the outer piston part 176 with the spring 136 seating against the inner diaphragm 170.

The cavity 62 of the housing 60 is formed by recessing 230 of the housing base 190, the recessing 232 of the cap 196, and the bores and counterbores 204 and 208 of the diaphragm mounting member 194. The housing recessings 230 and 232 are formed so that the area of the diaphragm 172 that is exposed by chamber 66 (which is thus the working area of diaphragm 172) exceeds the corresponding working area of the diaphragm 170 that is exposed by the chamber 64, by a predetermined percentage which determines the differential operating force of the modulating valve 40 that will operate same to close the shut off valve 72 and thus limit braking air entry into the brake cylinder 20, for empty load operation. While this percentage may be of any desired ratio depending on the application and objectives of the particular installation involved, levels in the range of from about 60 to about 62 percent are employed in the illustrated embodiment. Thus, in a modulating valve 40, the ratios of the exposed areas of the respective diaphragms 170 and 172 to the respective chambers in the modulating valve are such that that the shut off valve 72 closes when the pressure in the brake cylinder 20 is in the range of from about 60 to about 62 percent of the braking pressure that is to be in the brake cylinder when the car is riding loaded. As the braking air input pressure to the brake cylinder increases under empty load conditions, the shut off valve 72 opens and recloses to provide the higher pressure output to the brake cylinder, but in the design proportion relative to fully loaded car braking. The tubular member 70 has its end portion 240 formed to define the valve seat 68 of shut off valve 72 and has its other end portion 242 threaded for application to the threaded bore 244 defined by the housing base 190, into which the passage 76 opens.

The check valve 142 (see FIG. 1A) comprises a plurality of lateral openings or ports 246 formed in the tubular member 70 that open exteriorly of the tubular member 70 at a circumferential groove 248 about and within which is seated O-ring seal 250. The groove 48 is of inwardly convering shape, including side walls 247 and 249 (at least one of which is frusto-conical in shape), and seal 250 is proportioned to seat entirely within walls 247 and 249 and be spaced from ports 246 when in its closed position, to define an annular air flow distrubuting chamber 251 underlying seal 250 in which all of the ports 246 open. Thus, when the O-ring seal 250 is in its retracted or closed position shown in FIGS. 1 and 1A, the openings 246 are sealed check valve fashion, against air flow through the openings 246 in bypassing relation to the valve seat 68. However, when the air pressure within the tubular member 122, and thus within the brake cylinder 20 and brake cylinder pipe 44 when the brakes are released, exceeds that within the valve chamber 62, the O-ring seal 250 under the pressure uniformly building up on same in chamber 51 dialates outwardly radially thereof to open the check valve 142 for discharge of the braking air from the brake cylinder 20 the brake cylinder pipe 44, and the sensing device 42, through the valve 40, conduit 24, valve 12, and retainer 30.

As disclosed in said patents, the space within the valve member 58 is vented to the atmosphere through passage 275 formed in the housing member 194. The seals 277 similar to seals 166 and 168 are preferably employed where indicated in the valve 40 at 277.

Turning now to the sensor device 42, the casing 46 comprises a metallic body 280 suitably formed to define the lower portion of the chamber 48, the chamber 52, and the cylinder 96 in which the piston device 94 operates.

The chamber 48 comprises a bore 282 formed in the body 280 that is of cylinderical configuration and terminates in an annular floor 284 forming the top surface of a base wall 286 in which internally threaded bore 288 is formed that receives the check valve assembly 112. Body 280 is formed to define bracket portion 290 on one side of same which mounts pipe bracket 90, as by employing suitable mounting nut and bolt assemblies 292. The body 280 is ported for communication with the cylindrical part of chamber 48 to define air communication passage 294 that opens at port 296 at chamber 48, and terminates at port 298 at bracket plate 90 (see FIG. 3). The body 280 is formed with a planar top surfacing 300 to which is applied cover 302 that is held in place as by employing suitable bolts 304. The cover 302 is formed to define cylindrical bore 306 that forms the upper portion of chamber 48, and also is formed to define cylindrical recess 308 that forms the upper end of cylinder 96, with the bore 306 and recess 308 being connected by passage 310 that is formed in cover 302.

The piston device 94 comprises piston member 312 that is of generally cupped configuration defining top wall 314 and side flange 316, the latter having an annular protubrance 318 that is in sliding, motion guiding relation with the body cylindrical surfacing 320 that defines cylinder 96. The piston top wall 314 defines planar top surfacing 322 across which is applied imperforate diaphragm 324 formed from a suitable elastomeric material such as a suitable rubber-fabric laminate, which has its rim portion 325 applied downwardly about the side flange 316 of the piston and then returned upwardly in overlapping open loop relation thereto for anchoring of its marginal edge portion 326 in the groove 328 formed in the top surfacing 300 of the body 80 about cylinder 96 into which the marginal edge portion 326 is sealingly clamped by the application of the cover 302 to the body 280. Thus, the diaphragm 324 forms a fluid seal about the upper end of the cylinder 96 that seals off the piston member 312 and the portion of the cylinder 96 defined by body 280 from chamber 48. The diaphragm 324 and cover recess 308 form a chamber 330 above piston device 94 that chamber 48 communicates with through passage 310.

Threadedly secured to the piston member 312 is the piston rod 98 that is formed at its end 332 for connection with the lever member 100, with the lever member 100 being pivotally connected thereto by suitable pin 102.

The cover 302 is formed at one end of same with spaced apart lugs 334 between which dependent bar or link 105 is pivotally mounted employing suitable bolt and nut assembly 338. The bar 105 is thus pivotally connected to the cover 302 at its upper end 338, and at its lower end 340, bar 336 is pivotally connected to lever 100 by suitable pin 103.

In the specific form shown, the lever 100 comprises a pair of rectilinear spaced apart bar portions 342 that are integrally connected at annular end portion 344, and at their free ends 345 are received on either side of the lower end 340 of bar 105 for pivotal connection thereto, as by employing suitable bolt and nut fastening device 346 that forms pin 103. Body 280 is formed with a pair of spaced apart studs 348 that serve as movement guides for bar 105. Piston rod end 332 is received between the lever bar portions 342 for application to these parts of suitable pin 102.

The end portion 344 of the lever 100 is of ring configuration and defines internally threaded bore 350 that threadedly receives shank 352 of the sensor foot 104, which shank also has applied to same a pair of lock nuts 354 and 356 for locking the sensor foot 104 in the desired position of adjustment with respect to the lever 100. As indicated in FIG. 2, the foot 104 defines a contact surfacing 358 of spherically convex configuration for engagement with the stop 108. Stop 108 may be of any conventional type employed for empty and load sensing device purposes; as indicated, the stop 108 is fixed to the unsprung part of the car, namely a convenient part or portion of the truck side frame that is adjacent to the sprung part of the car to which the sensing device 42 is mounted. Pipe bracket 90 is suitably flanged as at 360 and receives suitable mounting bolts in its holes 362 for this purpose.

The piston rod 98 extends through opening 370 formed in the body 280, with the body at this point being suitably sealed by appropriate elastomeric seal rings 372 and 374 that are in seal tight relation between the piston rod 98 and the body 280 in any suitable manner. Compression spring 110 biases the piston assembly 94 to its retracted position of FIG. 2, with spring 110 being designed so that when chambers 48 and 330 are exposed to braking air pressure of approximately 15 pounds, the piston assembly 94 deflects downwardly of cylinder 96 in the direction of fulcrum lever device 116.

The fulcrum lever device 116 is shown in plan in FIG. 5 and comprises in the specific form illustrated in FIG. 5 a "Y" shaped rigid metallic bar member 380 defining stem portion 382 and yoke portion 383 curvilinear arms 384 and 386 that are disposed in embracing, substantially coaxial relation, with the piston rod 98 and spring 110, with the bar member 380 resting on the boss portion 388 of the housing 380, that is at the lower end of the cylinder 96, and forms a fulcrum 390 for the fulcrum lever device 116. The stem portion 382 of the device 116 is apertured as at 392 and has a base plate 394 affixed to the underside of same, as by welding, to serve as a mounting socket 396 for the plunger assembly 118.

The check valve assembly 112 comprises a tubular member 400 that per se is similar to the tubular member 70 of FIG. 1A and comprises threaded stud portion 402 that is threadedly mounted in the threaded bore 288, and flange portion 404 that seats against the floor 284 of recess 288 and against suitable O-ring seal 406. Tubular member 400 above the flange 402 is shaped to define a check valve 142A that is the same as check valve 142 shown in FIG. 1A, including suitable O-ring seal 250A and the plurality of laterally spaced openings or ports 246A. The tubular member 400 defines bore 401 and at its upper end 408 defines check valve seat 410 against which is seated check valve member 412 that is biased against the seat 410 by suitable compression spring 414 seated between check valve member 412 and the cover 302. For this purpose, the check valve member 412 is formed with stud portion 416 and the cover 302 is recessed as at 418 to form spring seats for compression spring 414. As indicated in FIGS. 4 and 10, the check valve member 412 about its rim portion 420 is formed to define a plurality of rounded movement guiding studs 422 that are in free sliding relation with the cylindrical side wall 424 of the recess 306 defined by the cover 302 which forms the upper portion of the chamber 48, while accommodating brake air flow to the upper part of chamber 48 for communication to chamber 330. Check valve member 412 on its underside defines planar or flat sealing surface 423 that normally seats against valve seat 410 in sealing relation thereto under that action of spring 414, except when valve member 412 is separated from its seat 410 by the operation of lever device 116 and plunger assembly 118.

The plunger assembly 118 as shown in FIGS. 2 and 9 comprises a headed pin 426 having the end 428 of its shank 429 received in socket 396 of the frulcrum lever device 116, and with the pin shank 429 being slidably mounted in suitable bearing 430 suitably fixedly mounted in the wall structure 432 of the body 280 that underlines the chamber 52, and including suitable seals 431 and 433 against braking air leakage past bearing 430. The headed pin 426 includes head portion 434 of excised or fluted disc configuration that is in free sliding relation with the bore 401 of the tubular member 400 and having seated on top of same a cupped spring seat 436 having a cylindrical side wall 438 in free sliding relation to the bore of the tubular member 400, and a web portion 440 that is apertured as at 441 to receive the stem 442 of screw member 444, which stem 442 is threadedly received in spring seat 446 that is normally slightly spaced from check valve member 412, and specifically, its sealing surface 423. Suitable compression spring 448 having one end 445 of same bearing against flange 443 of spring seat and the other end 447 of same seating against the web portion 440 of seat 436 normally biases the head 450 of the screw member 444, which is disposed within the seat 436, against its web portion 440 on the inside of same. Screw member 444 is threadedly adjusted relative to seat 446 to normally space the surface 446A of seat 446 from surface 423 of valve member 412, in the at rest positions of lever device 116 and plunger assembly 118, some nominal distance, such as less than 1/16th inch, so that a perciptable motion of lever device 116 and plunger assembly 118, respectively, is required to bring seat surface 446A against valve sealing surface 423. The side wall 438 of spring seat 436 is suitably fluted as at 451 (see FIG. 11), the head portion 434 of pin 426 is suitably fluted or excised, as at 453 (see FIG. 12), to accommodate the requisite rapid air flow by same when valve member 412 is separated from its seat 410; for this purpose head portion 434 in the form shown is of generally triangular configuration defining rounder corners 435 that are struck on a diameter complementing that of bore 401 for sliding relation thereto. Further, spring seat side wall 438 has an outer diameter that is adequately less then the diameter of tubular member bore 401 for loose fit reception of same therein for further accommodating air flow by same, on release of valve assembly 112.

The plunger assembly 118 is arranged so that the compressive force of the spring 448 is greater than the combined downward force of the spring 414 and the braking air pressure loading check valve member 412 as long as the pressure of the braking air in chamber 48 is below approximately 22 psi. The significance of this will be plain as the description of the operation of the specific features of the load sensing device 42 proceeds.

It will thus be seen that the plunger device 118 is of a resiliently flexible nature and has operational significance in view of the rigid nature of the fulcrum lever device 116 which in the embodiment of FIG. 2 is intended to be entirely rigid.

Figure 8:
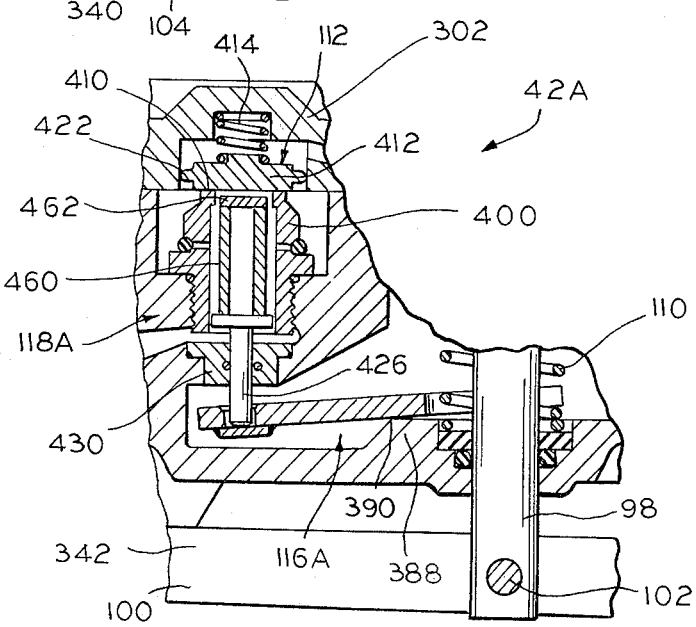
FIG. 8 is a fragmental view of the internal components of the sensor device in accordance with a modified form of the invention, and viewed as depicted in FIG. 2.

In the varient embodiment of FIG. 8, the fulcrum lever device 116A is of the same configuration as the lever 116, but is of leaf spring construction so as to be resiliently flexible in the same manner that plunger assembly 118 is resiliently flexible in the embodiment of FIG. 2.

In the embodiment of FIG. 8, the plunger assembly 118A is rigid and involves the headed stem 426 on which is seated rigid tubular member 460 having headed end 462 which is normally spaced slightly below check valve member 412 in a manner comparable to the corresponding parts of assembly 118; tubular member 460 has the external surfacing of its side wall 463 suitably fluted or excised, for instance, as suggested by the fluting 451 of spring seat 436 (see FIG. 11), to accommodate the requisite rapid air flowing by same when valve member 412 is separated from its seat 410. The other components of the load sensing device 42A of FIG. 8 are the same as described and illustrated in connection with the device 42 of FIG. 2. The resilient nature of device 116A bears the same relation to spring 414 and the braking air pressure in chamber 48 that spring 448 of plunger device 118 has.

With regard to the specific load sensing devices 42 and 42A that are disclosed herein, the compression spring 110 of piston device 94 in practice is proportioned and calibrated to yield when the braking air pressure on the braking air exposed to chamber 48 and diaphragm 312 through passage 310 is approximately 15 psi, as already indicated. With regard to the check valve assembly 112, and plunger assembly 118, the combination of parts, and specifically the plunger assembly spring 448 and the check valve hold down spring 414 are proportioned and calibrated so that the compressive force exterted by spring 448 is greater than that exerted by spring 414 plus the pressure of the braking air in chamber 48 so long as the braking air pressure in the chamber 48 is below about 22 psi; thus, braking air pressures in chamber 48 above this level will, together with the compressive force executed by spring 414, be effective to hold check valve assembly closed until the braking air pressure drops below the indicated approximate 22 psi level, in chamber 48. The valve assembly 112 and the plunger assembly 118A in combination with resilient lever device 116A have the same relationships.

Thus, it is a feature of the present invention that when the pressure of the braking air reaches about 22 psi, the check valve assembly 112 is in effect locked closed during the remainder of the braking stroke. It is thus apparent that, for braking while the car is partially loaded or rides empty, the opening of the check valve assembly 112 is to occur prior to the pressure of the braking air in the chamber 48 reaching about 22 psi. As indicated, when the pressure in the chamber 48 reaches about 15 pounds, the piston device 94 moves towards its extended relation to extend measuring lever 100; this occurs a few seconds after the braking stroke starts.

Furthermore, it is preferred that the sensing devices 42 and 42a and stop 108 therefor be mounted so that when the car is loaded at approximately 20 percent capacity, the sensing lever foot 104 will just engage the stop 108 and be at its maximum position of measuring extension from the body 280, at which position piston 312 will be at its maximum position of travel downwardly of its cylinder to thereby have struck lever devices 116 to actuate same. Thus, at empty car riding conditions, the sensing lever 100 will be at its fully extended position with its foot 104 spaced from stop 108.

The operation will be described assuming load sensing device 42 is employed; load sensing device 42A operates similarly, but with its resiliency insofar as plunger assembly 118A is concerned being in resilient lever device 116A.

OPERATION

The brake equipment 10 is charged in the usual mnner, with the braking air under pressure being supplied to the brake pipe 14 by the usual locomotive brake valve to control the AB control valve 12 in the usual manner to effect charging of the reservoirs 16 and 18 (assuming, of course, that the car to which the brake equipment 10 is applied is connected in a train in the usual manner). As usual, when the brakes are in released relation, the brake cylinder 20 is vented and closed off from the fluid pressure in the brake pipe 14 by the operation of the AB control valve 12, and it follows that modulating valve 40, load sensing device 42, and volume reservoir 56 are likewise similarly vented and closed off from the braking air pressure in the brake pipe 14.

When it is desired to effect a service brake application, the brake valve at the train locomotive is actuated to reduce the braking air pressure in the brake pipe 14 an amount corresponding to the degree of brake application desired. This reduction in pressure in the brake pipe 14 causes the service portion 22 of the control valve 12 to close off connection to retainer valve 30 and connect the auxiliary reservoir 16 through pipe 17 and pipe 24 to the modulating valve 40. At modulating valve 40, the air flow is through passage 78, chamber 64, shut off valve 72 which is normally held open by compression spring 136, the bore 74 of tubular member 70, passage 76, air brake cylinder pipe 44 as well as side conduit 50 to chambers 48 and 330 of the load sensing device 42. As indicated, check valve assembly 112 is normally closed, and when the braking air pressure in the brake cylinder pipe 44 and chambers 48 and 330 of load sensing device 42 reaches approximately 15 psi, the spring 110 of sensing device piston device 94 yields whereby the measuring stroke of lever 100 is effected.

Assuming the car is riding loaded, the sensing lever contact foot 104 strikes the stop 108 well before the piston device 94 approaches the lever device 116. Consequently, for the remainder of the braking stroke, the plunger device 118 will be dormant (lacking rock and roll) and when the braking air pressure rises above about 22 psi in the chamber 48, the check valve assembly 112 is in effect locked against opening for the remainder of the braking stroke due to the pressure of the braking air bearing on check valve member 412 in holding same seated against the check valve seat 410. Since the chamber 52 of the load sensing device thus remains sealed off from the braking air pressure during the remainder of the braking stroke, the differential operation of the modulating valve 40 does not occur; as has been indicated, the differential operation the modulating valve 40 occurs only when the car is riding lightly loaded or empty, such as to effect opening of the check valve assembly 112 by way of lever device 116 and plunger assembly 118.

On release, the normal operating pressure in the brake pipe 14 is restored by operation of the usual brake valve in the locomotive, and this causes control valve 12 to close off communication between the reservoir 16 and the air conduit 24 and the components downstream of same, and opens the conduit 24, and thus the modulating valve 40, brake cylinder pipe 44, brake cylinder 20, and chambers 48 and 330 of the load sensing device, to exhaust through conduit 28 and retainer valve 30. The pressure differentials within the modulating valve 40 effect opening of the check valve 142 to discharge the air trapped within the brake cylinder, conduits 44 and 50, and chamber 48 of load sensing device 42 by the O-ring 250 dialating under the air pressure differential involved. As the pressure of the braking air drops below 15 psi in chambers 48 and 330, spring 110 of piston device 94 restores the sensing lever 100 to its fully retracted position of FIG. 2 in readiness for the next brake application.

In the event that the car is riding empty or nearly so, the sprung portion of the car is riding proportionately higher on the car truck springs so that the load sensing device 42 is elevationally positioned above the stop 108 a distance that will effect a full working stroke of the piston device 94 and sensing lever 100. This functioning of the piston device 94 and lever 100 takes place when the braking air pressure in sensing device chambers 48 and 330 reaches approximately 15 psi so that the sensing lever 100 swings immediately to its full stroke position, for instance the lower dashed line position of FIG. 2. In so doing, piston member 312 (which is shown in outline in FIG. 5) strikes the yoke portion 383 of the lever device 116, fulcruming it downwardly about fulcrum 390 to swing its socketed end upwardly and thus bring the plunger assembly 118 against check valve member 412 and compress same thereagainst, with spring seat 446 pressing against valve member 412 in opposition to the bias of spring 414. For empty load and lightly loaded conditions up to about 20 percent of capacity this action occurs well prior to the braking air pressure building up in brake cylinder pipe 44 and chambers 48 and 330 of the load sensing device having reached the indicated approximate 22 psi level. The resulting compressing of the plunger device 118 against valve member 412 is therefore effective to lift the check valve member 412 off its seat (against the biasing action of spring 414) allowing the braking air to flow directly from chamber 48 to chamber 52 through tubular member 400. In so doing, the spring seat 436 is pressed against spring 448 to compress same, with seat 436 thus being shifted longitudinally of headed screw 442 toward seat 446.

The braking air now passes from chamber 52 through conduit section 55, volume reservoir 56, conduit section 57, and into the modulating valve chamber 66 through its passage 80. As disclosed in said patents, the modulating valve 40 is arranged such that when a minimum service application is made no brake cylinder pressure reduction is effected by the differential nature of the valve member 174, whereby brake shoe contact with the car wheels is effected with the force required by the AAR at a minimum brake application (approximately 10 psi brake cylinder pressure). As the braking stroke is initiated and proceeds to minimum service level application, the braking air pressure of the chamber 64 plus the biasing action of compression spring 136 holds the shut off valve 72 of the modulating valve open for continued transmittal of the braking air therethrough to the brake cylinder 20 with the braking air also being supplied to and building up pressure in chambers 48, 52 and 330 of the sensing device 42. As indicated, the working area of the diaphragm 172 of the modulating valve 40 exposed to chamber 66 exceeds the working area of the diaphragm 170 that is exposed to the chamber 64 by the indicated predetermined ratio (in the range of from approximately 60 to approximately 62 percent), and as the pressure of the braking air builds up in the brake cylinder 20 to the desired percentage of the air pressure of the conduit 24 upstream of valve 40, the force acting on the diaphragm 172 overcomes the action of the opposing braking air fluid pressure generated force acting on the diaphragm 170 as well as that of spring 136, to seat the valve member 58 against the seat 68, thus shutting off valve 72 and closing off further braking air flow to the brake cylinder 20.

Once the shunt off valve 72 is closed, further increases in braking air input pressure to modulating valve 40 open valve 72 and effect closing of same in the same manner to keep the working pressures in the brake cylinder 20 at the desired approximately 60 to 62 percent of the braking air pressure of conduit 24.

More specifically, as the braking stroke proceeds under empty or lightly loaded conditions, when the braking air pressure in chamber 52 reaches approximately 60 to 62 percent of the braking air pressure in chamber 48, the differential valve member 58 acts to close the shut off valve 72, with the valve 72 reopening and closing as braking input pressure increases through the full braking stroke. The net result is that the car wheels are braked with forces appropriate for empty load braking.

On release of the brakes, normal operating pressure in the brake pipe 14 is restored by the usual operation of the familiar brake valve in the locomotive. Control valve 12 is thereby operated to close off communication between the reservoir 16 and the conduit 24 and again open conduit 24 to communication to exahust through pipe 28 and retainer valve 30. The braking air of the brake cylinder 20 and brake cylinder pipe 44 vents through the valve 40 as aforedescribed, by way of check valve 142. The air of chambers 48 and 330 of sensing device 42 is vented through the modulating valve 40 in a similar manner, whereby piston device 94 and sensing lever 100 return to their retracted full line positions of FIG. 2, whereby plunger device 118 returns to its extended relation, and since chamber 48 is subject to venting conditions, check valve member 412 is returned by pressure spring 414 to sealing relation with valve seat 410.

Meanwhile the air pressure of the volume reservoir 56, modulating valve chamber 66, and conduit sections 54 and 57 is released to chamber 48 through check valve assembly 112 by operation of the check valve 142A, which operates in the same manner as check valve 142. Thus, the O-ring 250A dialates under the air pressure differential involved to pass the air from the tubular member 400 by way of its ports or orifices 246. As venting is completed, the modulating valve spring 136 positions the shut off valve 72 in its fully open position in readiness for the next braking stroke.

The operation of the apparatus 10 for emergency brake operation is similar except that the braking air is supplied from emergency reservoir 18 through conduit 19 to control valve 12.

ROCK AND ROLL ACCOMMODATION

A special feature of the brake equipment 10 of the present invention is that the load sensing device 42 is so arranged that inadvertent setting of same for empty load conditions when the car rides loaded, and vice versa, are avoided.

When the car rides loaded and rock and roll is occasioned during the braking stroke, since the check valve assembly 112 in effect locks up against opening, as the braking pressure passes the approximate 22 psi level at the brake cylinder 20 and sensing device chamber 48, and remains above such level, no amount of swinging movement of the load sensing device lever 100 will open the check valve assembly 112 during the completion of the braking stroke.

Thus, during the rock and roll action, the car body tends to roll from side to side on its truck springs. The sensing lever 100, while being biased against the stop 108 by the braking air pressure of chamber 330 acting on piston device 94, will follow this motion. However, since the check valve member 412, of assembly 112, remains held in sealing relation with seat 410 for the remainder of the braking stroke, as and after the braking air pressure passes the approximate 22 psi level in brake cylinder 20 and sensing device chamber 48, and remains above that level for the remainder of the braking stroke, no amount of movement of the sensing device sensing lever 100 will effect opening of the check valve assembly 112. The plunger assembly 118 merely contracts and extends by way of the flexing of spring 448 to the extent that the piston device 94 effects fulcruming of the lever device 116, with valve member 412 being held against its seat 410, against that action of plunger assembly 118 and its spring 448, by the combination of the braking air pressure in chamber 48 and spring 414 acting on valve member 412.

When the car is riding empty or nearly so, once the check valve assembly 112 has been opened by the operation of piston device 94, fulcrum lever device 116 and the plunger assembly 118, it remains open for the full extent of the empty load braking stroke. Even though piston device 94 may shift away from fulcrum lever device 116 due to rock and roll in the empty load condition, once check valve member 412 is open, the pressures in chambers 48 and 52 become equalized and the modulating valve is set for differential operation, which setting remains through the completion of the brake stroke. Further, during the braking stroke, the compressive force of compression spring 448 holds it open through completion of the braking stroke even though sensing lever 100 may reach loaded car position as the rock and roll action proceeds during the braking stroke. It is only after such braking stroke is completed that check valve member 412 is returned to its seat 410 by its spring 418, under the vented conditions then involved in chamber 48, (as aforedescribed).

Another special feature of the brake equipment 10 is that the only venting of the braking air is at the retainer 30. Specifically, there is no venting of the braking air at either the modulating valve 40 or the sensing device 42 at any position of the sensing device 42 sensing lever 100. Thus, all braking air pressure intended for the braking cylinder 20 is supplied thereto free of venting short of the retainer valve 30, though, of course, under empty of lightly loaded conditions, modulating valve 40 controls the supply of the braking air pressure to the brake cylinder 20 at the approximately 60 to 62 percent pressure levels indicated.

As also indicated, as the maximum extended position of the sensing lever 100 is reached when the stop 108 is at the approximate 20 percent load capacity of the car, for the fully empty condition the foot 10 does not contact the side frame stop 108. This minimizes wear on the components involved by avoiding mechanical contact of the sensor measuring lever arm during all car empty brake applications.

Empty and load equipment using sensing device 42A instead of sensing device 42 operates in the same manner except that the flexing of the sensing device measuring mechanism is in the resiliently flexible lever device 116A.

The volume reservoir 56 under empty load conditions is at the pressure of modulating valve chamber 66. Its purpose is to insure harmonious operation of the car equipped with the equipment 10, with other cars in the train that have standard AAR brake equipment. The size of the reservoir 56 is proportioned so that full service and emergency equalization pressures meet AAR standards. Volume reservoir 56 thus accepts the air that is not to be supplied to the brake cylinder 20 due to the reduced pressures of operation involved for empty operation, and makes this air available as the pressure fluid back up that insures full control valve compliance with AAR standards.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In empty and load air brake control apparatus for use in railroad cars of the type having a sprung car body portion resiliently supported in sprung relation to an unsprung portion of the car and including a brake pipe normally charged with braking air under pressure, a reservoir normally air charged to the pressure of the air in the brake pipe, a brake cylinder for effecting a braking application, an air pressure responsive brake application control valve operative in response to pressure decreases in the brake pipe to control the supply of braking air under pressure from said reservoir to said brake cylinder through air conduit means for causing a brake stroke application and including a retainer device for venting the braking air that effects the braking stroke to atmosphere through the air conduit means, on completion of the brake application in response to pressure increases in the brake pipe, with the air conduit means including a modulating valve for changing the pressure of the supply of the braking air to the brake cylinder between that appropriate for load conditions and that appropriate for empty conditions, a stop carried by the unsprung portion of the car, and a load sensing device carried by the car body sprung portion adjacent the stop and including a load sensing member movable for engagement with the stop on the brake stroke application for controlling the pressure changing of the modulating valve in accordance with the car body being under empty or load conditions, the improvement wherein:

said modulating valve comprises:

housing means defining a cavity across which is mounted a differential valve member forming a first full braking pressure chamber on one side thereof and a second partial braking pressure chamber on the other side thereof, a valve seat opening to said first chamber against which said valve member may seat to close off fluid flow through said seat, said valve member having exposed in said chambers on either side of same working areas of which the working area exposed to said second chamber is greater than the working area of same that is exposed to said first chamber by a predetermined ratio, whereby when said chambers are subject to fluid pressure in said passages, said valve member will be subject to a differential pressure force biasing same toward said seat, means for biasing said valve member away from said seat, said air conduit means including first pipe means communicating between said control valve and said modulating valve first chamber for supplying braking air at full braking pressure thereto and venting same through the retainer device, second pipe means communicating between said modulating valve seat and the brake cylinder for communicating said braking air between said valve seat and the brake cylinder, and third pipe means including a volume reservoir communicating between said modulating valve second chamber and said second pipe means through the load sensing device for supplying braking air at the partial braking pressure to the brake cylinder when said valve member closes said valve seat, said load sensing device comprising:

a casing including piston means for actuating said load sensing member, with said casing defining a first chamber in open communication with one side of said piston means, said second pipe means being in communication with said casing first chamber for communicating said braking air thereto for moving said piston means to shift said load sensing member toward its extended relation, means for biasing said load sensing member to its retracted relation that yields when the pressure of the braking air in said casing first chamber is on the order to fifteen psi, said casing defining a second chamber spaced and isolated from said piston means with said third pipe means communicating with said casing second chamber, a check valve assembly interposed between said casing chambers and including means for biasing same in closed relation for maintaining said casing first chamber sealed off from said casing second chamber on operation of said apparatus when the car body is under load conditions, and linkage means actuated by said piston means for opening said check valve assembly to communicate said casing second chamber to said casing first chamber when the car body is under empty conditions, said linkage means comprising a fulcrumed lever device having one end of same in lost motion relation to said piston means for fulcruming actuation thereby when said load sensing member has moved to its extended relation for biasing said check valve assembly to open relation, said check valve assembly biasing means having a biasing action opposing the biasing action of said lever device that holds said check valve assembly in closed relation when the pressure of said braking air in said casing first chamber is above about twenty-one psi, whereby, on operation of said apparatus when the car body is under empty conditions, the load sensing member is shifted by said casing piston to move the load sensing member to its said extended relation, said lever device is actuated by said piston means to place said check valve assembly in its open relation, whereby the braking air is communicated from said casing first chamber to said casing second chamber and thence through said third pipe means to said modulating valve second chamber whereby said modulating valve member closes said modulating valve seat and the braking air at said partial braking pressure is communicated through said casing first chamber to said second pipe means and the brake cylinder for empty load brake operation of said apparatus.

2. The improvement set forth in claim 1 wherein:
said lever device comprises a rigid lever member,
and wherein said check valve assembly is resiliently flexible axially of same for accommodating said fulcruming action of said lever device under rock and roll conditions when the car body is under loaded conditions.

3. The improvement set forth in claim 1 wherein:
said check valve assembly comprises a rigid plunger means,
and said lever device comprises a resiliently flexible lever member for accommodating said fulcruming action of said lever device under rock and roll conditions when the car body is under loaded conditions.

4. The improvement set forth in claim 1 wherein:
said load sensing device is free of braking air exhaust for both loaded and empty braking operation of said apparatus.

5. The improvement set forth in claim 1 wherein:
said modulating valve, said air conduit means and said load sensing device are connected for full braking air exhaust only at the retainer device.

6. The improvement set forth in claim 1 wherein:
said modulating valve is separate and discrete from the control valve.

7. The improvement set forth in claim 1 wherein:
said modulating valve is a component part of said control valve.

8. In empty and load air brake control apparatus for use in railroad cars of the type having a sprung car body portion resiliently supported in sprung relation to an unsprung portion of the car and including a brake pipe normally charged with braking air under pressure, a reservoir normally air charged to the pressure of the air in the brake pipe, a brake cylinder for effecting a braking application, an air pressure responsive brake application control valve operative in response to pressure decreases in the brake pipe to control the supply of braking air under pressure from said reservoir to said brake cylinder through air conduit means for causing a brake stroke application and including a retainer device for venting the braking air that effects the braking stroke to atmosphere through the air conduit means, on completion of the brake application in response to pressure increases in the brake pipe, with the air conduit means including a change over valve for changing the pressure of the supply of the braking air to the brake cylinder between that appropriate for load conditions and that appropriate for empty condition, a stop carried by the unsprung portion of the car, and a load sensing device carried by the car body sprung portion adjacent the stop and including a load sensing member movable for engagement with the stop on the brake stroke application for controlling the pressure changing of the modulating valve in accordance with the car body being under empty or load conditions, the improvement wherein said load sensing device comprises:

a casing including piston means for actuating said load sensing member, with said casing defining a first chamber in open communication with one side of said piston means, pipe means for communicating the braking air to said casing first chamber for moving said piston means to shift said load sensing member toward its extended relation, means for biasing said load sensing member to its retracted relation that yields when the pressure of the braking air in said casing first chamber is on the order of fifteen psi, said casing defining a second chamber spaced and isolated from said piston means, second pipe means for communicating said casing second chamber with the change over valve, a check valve assembly interposed between said casing chambers and including means for biasing same in closed relation for maintaining said casing first chamber sealed off from said casing second chamber on operation of said apparatus when the car body is under load conditions, and linkage means actuated by said piston means for opening said check valve assembly to communicate said casing second chamber to said casing first chamber when the car body is under empty conditions, said linkage means comprising a fulcrumed lever device having one end of same in lost motion relation to said piston means for fulcruming actuation thereby when said load sensing member has moved to its extended relation for biasing said check valve assembly to open relation, said check valve assembly biasing means having a biasing action opposing the biasing action of said lever device that holds said check valve assembly in closed relation when the pressure of said braking air in said casing first chamber is above about twenty-one psi, whereby, on operation of said apparatus when the car body is under empty conditions, the load sensing member is shifted by said casing piston to move the load sensing member to its said extended relation, said lever device is actuated by said piston means to place said check valve assembly in its open relation, whereby the braking air is communicated from said casing first chamber to said casing second chamber and thence through said second pipe means to said change over valve whereby the braking air at partial braking pressure is communicated through said casing first chamber to the brake cylinder for empty load brake operation of said apparatus.

9. The improvement set forth in claim 8 wherein:
said lever device comprises a rigid lever member,
and wherein said check valve assembly is resiliently flexible axially of same for accommodating said fulcruming action of said lever device under rock and roll conditions when the car body is under loaded conditions.

10. The improvement set forth in claim 8 wherein:
said check valve assembly comprises a rigid plunger means,
and said lever device comprises a resiliently flexible lever member for accommodating said fulcruming action of said lever device under rock and roll conditions when the car body is under loaded conditions.

11. The improvement set forth in claim 8 wherein:
said load sensing device is free of braking air exhaust for both loaded and empty braking operation of said apparatus.

12. In empty and load air brake control apparatus for use in railroad cars of the type having a sprung car body portion resiliently supported in sprung relation to an insprung portion of the car and including a brake pipe normally charged with braking air under pressure, a reservoir normally air charged to the pressure of the air in the brake pipe, a brake cylinder for effecting a braking application, an air pressure responsive brake application control valve operative in response to pressure decreases in the brake pipe to control the supply of braking air under pressure from said reservoir to said brake cylinder through air conduit means for causing a brake stroke application and including means for venting the braking air that effects the braking stroke to atmosphere through the air conduit means, on completion of the brake application in response to pressure increases in the brake pipe, with the air conduit means including a changeover valve for changing the pressure of the supply of the braking air to the brake cylinder between that appropriate for load conditions and that appropriate for load conditions and that appropriate for empty conditions, and with the changeover valve being normally conditioned for effecting the supply of the braking air to the brake cylinder at load conditions, the method of supplying the braking air from the control valve to the brake cylinder, said method comprising:

when the braking air pressure is reduced in the brake pipe for a brake application, supplying braking air to the braking cylinder and when the pressure of the braking air being supplied to the brake cylinder reaches about fifteen psi, utilizing the braking air to sense the load condition of the car body relative to the unsprung portion of the car, and where the car rides loaded, when the braking air being supplied to the brake cylinder reaches about twenty-two psi, securing the changeover valve against changeover to supplying the braking air to the brake cylinder at pressures appropriate for empty conditions free of changing by rock and roll effects on the car body, and where the car rides empty, effecting changeover of the changeover valve for changing the pressure of the braking air supplied to the brake cylinder to that appropriate for empty conditions, and securing the changeover valve against change back to the supply of the braking air to the brake cylinder at pressures appropriate for load conditions free of changing by rock and roll effects on the car body.

13. The method set forth in claim 12 wherein:
when the car rides empty and the braking air pressure is restored to the brake pipe for release of the brakes,
changing the changeover valve back to conditioning for effecting the supply of the braking air to the brake cylinder at load conditions.

14. The method set forth in claim 12 wherein:
when the braking air pressure is restored to the brake pipe for release of the brakes,
releasing all braking air in the brake cylinder and the air conduit means at the control valve venting means.

15. For use with empty and load air brake control apparatus for railroad cars of the type having a sprung car body portion resiliently supported in sprung relation to an unsprung portion of the car and including a brake pipe normally charged with braking air under pressure, a reservoir normally air charged to the pressure of the air in the brake pipe, a brake cylinder for effecting a braking application, an air pressure responsive brake application control valve operative in response to pressure decreases in the brake pipe to control the supply of braking air under pressure from said reservoir to said brake cylinder through air conduit means for causing a brake stroke application and including a retainer device for venting the braking air that effects the braking stroke to atmosphere through the air conduit means, on completion of the brake application in response to pressure increases in the brake pipe, with the air conduit means including a change over valve for changing the pressure of the supply of the braking air to the brake cylinder between that appropriate for load conditions and that appropriate for empty conditions, and a stop carried by the unsprung portion of the car, a load sensing device to be carried by the car body sprung portion adjacent the stop and including a load sensing member movable for engagement with the stop on the brake stroke application for controlling the pressure changing of the modulating valve in accordance with the car body being under empty or load conditions, said load sensing device comprising:
a casing including piston means for actuating said load sensing member, with said casing defining a first chamber in open communication with one side of said piston means, means for communicating the braking air to said casing first chamber for moving said piston means to shift said load sensing member toward its extended relation, means for biasing said load sensing member to its retracted relation that yeilds when the pressure of the braking air in said casing first chamber is on the order of fifteen psi, said casing defining a second chamber spaced and isolated from said piston means, said casing including means for connecting said casing second chamber with the change over valve, a check valve assembly interposed between said casing chambers and including means for biasing same in closed relation for maintaining said casing first chamber sealed off from said casing second chamber on operation of said apparatus with said load sensing device applied thereto when the car body is under load conditions, and linkage means actuated by said piston means for opening said check valve assembly to communicate said casing second chamber to said casing first chamber when the car body is under empty conditions, said linkage means comprising a fulcrumed lever device having one end of same in lost motion relation to said piston means for fulcruming actuation thereby when said load sensing member has moved to its extended relation for biasing said check valve assembly to open relation, said check valve assembly biasing means having a biasing action oppositing the biasing action of said lever device that holds said check valve assembly in closed relation when the pressure of said braking air in said casing first chamber is above about twenty-one psi.

16. The improvement set forth in claim 15 wherein:
said lever device comprises a rigid lever member,
and wherein said check valve assembly is resiliently flexible axially of same for accommodating said fulcruming action of said lever device under rock and roll conditions when the car body is under loaded conditions.

17. The improvement set forth in claim 15 wherein:
said check valve assembly comprises a rigid plunger means,
and said lever device comprises a resiliently flexible lever member for accommodating said fulcruming action of said lever device under rock and roll conditions when the car body is under loaded conditions.

18. The improvement set forth in claim 15 wherein:
said load sensing device is free of braking air exhaust for both loaded and empty braking operation of said apparatus.

* * * * *